Oct. 12, 1954 — M. W. GUYER — 2,691,468
DISPENSER FOR GRANULAR MATERIALS
Filed July 26, 1949 — 2 Sheets-Sheet 1
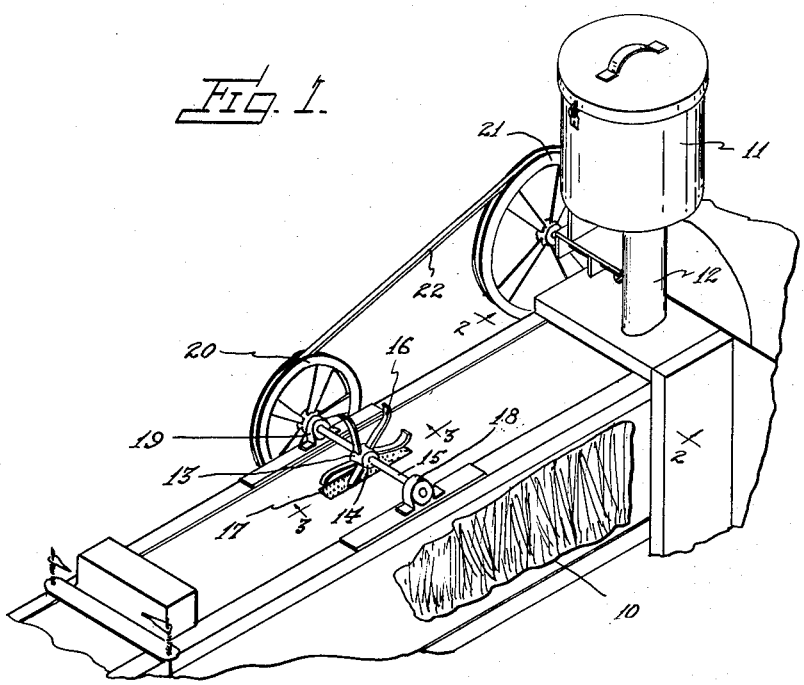
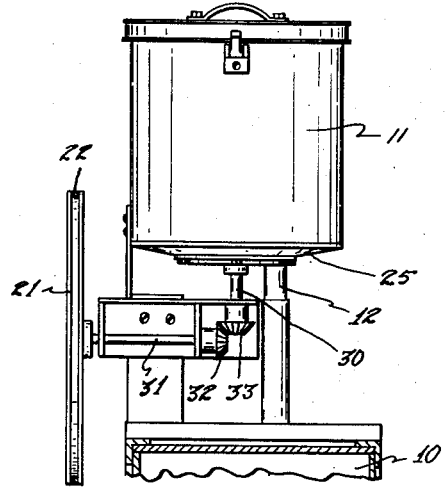
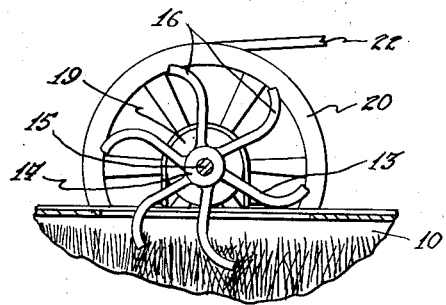
INVENTOR.
Morris W. Guyer
BY Fred Wells
atty Oct. 12, 1954 M. W. GUYER 2,691,468
DISPENSER FOR GRANULAR MATERIALS
Filed July 26, 1949 2 Sheets-Sheet 2
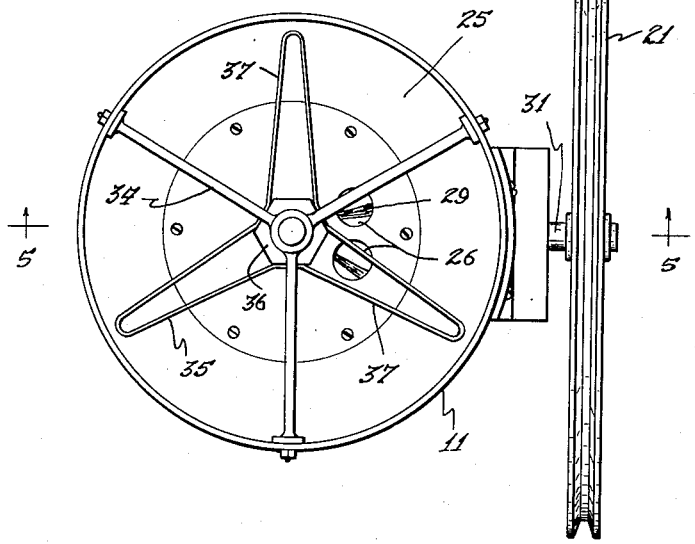
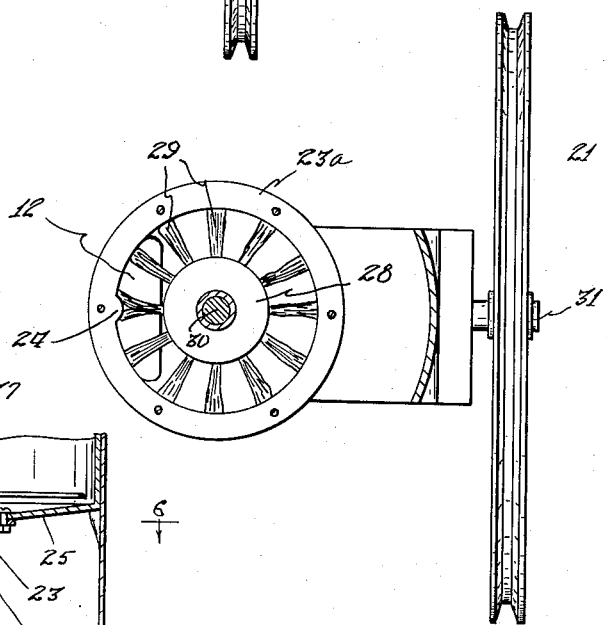
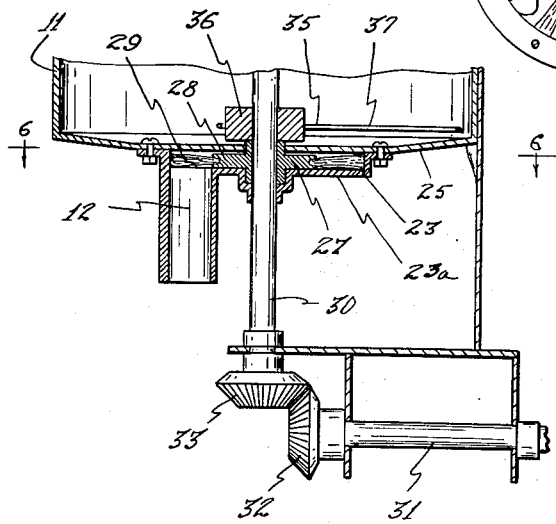
INVENTOR.
Morris W. Guyer
BY
Truth Wells
atty Patented Oct. 12, 1954

2,691,468

UNITED STATES PATENT OFFICE 2,691,468

DISPENSER FOR GRANULAR MATERIALS

Morris W. Guyer, Spokane, Wash., assignor to Calkins Manufacturing Company, Spokane, Wash., a corporation of Washington Application July 26, 1949, Serial No. 106,755

1 Claim. (Cl. 222—406)

My invention relates to improvements in a dispenser for granular materials.

It is the principal purpose of my invention to provide a simple device which will distribute powder, granular material and the like, into the hay as it is being baled. My invention contemplates gearing the powder feed to the travel of the hay in the baler in a novel manner so as to proportion the powder directly to the amount of the hay being baled.

It is a further purpose of my invention to provide a novel powder feed device operable to meter the powder from a hopper and force it into the outlet that opens directly into the hay passage of the baler.

The nature and advantages of my invention will appear more fully from the following description and the accompanying drawings wherein a preferred embodiment of the invention is shown. It should be understood however, that the drawings and description are illustrative only and are not to be taken as limiting the invention except insofar as it is limited by the claim.

In the drawings:

Figure 1 is a fragmentary perspective view of a typical hay baler showing my invention as applied thereto;

Figure 2 is a fragmentary sectional view taken on the line 2—2 of Figure 1;

Figure 3 is a sectional view taken on the line 3—3 of Figure 1;

Figure 4 is a plan view of the powder hopper employed in my invention;

Figure 5 is a sectional view taken on the line 5—5 of Figure 4; and

Figure 6 is a sectional view taken on the line 6—6 of Figure 5.

Referring now to the drawings and particularly to Figure 1, this view shows only a sufficient amount of the hay baler to indicate the manner in which my improved powder feed is applied thereto. The baler has a passage at 10 through which the hay travels as it is compressed by the ram head, not shown. According to my invention, I mount a powder hopper 11 on the hay baler with its outlet 12 opening into the passage 10 in position to drop the powder or granular material into the hay being compressed. I mount a drive member 13 for the powder feed on the hay baler so that it extends into the hay passage 10 and is actuated by the movement of the hay along the passage 10. This drive member is shown as a hub 14 fixed on a shaft 15 and provided with a series of hooked fingers 16 that extend down through an opening 17 into the hay passage 10.

Bearing blocks 18 and 19 mount the shaft 15 on the baler. The shaft 15 carries a pulley 20 which drives the powder feed pulley 21 by means of a belt 22.

In the hopper 11, I provide a small circular chamber 23 at the bottom and the outlet 12 is located just inside the periphery of the circular chamber 23. A projection 24 is formed in the chamber 23 directly over the outlet 12 for causing the brush to flip off the powder as it passes over the outlet.

The hopper 11 has its bottom 25 provided with one or more inlet openings 26 for delivering powder into the chamber 23. The openings 26 are spaced annularly about the chamber 23 from the outlet 12 so that there is no possibility of powder dropping through the chamber 23 from the inlet 26 to the outlet 12.

A metering device in the form of a rotary brush 27 is located in the chamber 23. This rotary brush has an enlarged hub portion 28 and spaced bristles 29 which are relatively stiff and resilient. The bristles are long enough to sweep the peripheral wall of the chamber 23 as the brush 27 is rotated. The brush 27 is driven by a vertical shaft 30 which extends up through the bottom 25 of the hopper and through the casing 23a which cooperates with the bottom 25 to form the chamber 23. The outlet member 12 is also an integral part of this casting. The shaft 30 is driven from the pulley 21 by a shaft 31 and beveled gears 32 and 33. The shaft 30 extends upwardly in the hopper and is held near the top of the hopper by a spider 34 which is bolted to the hopper wall. Inside the hopper directly over the hub 28 of the brush 27, an agitator 35 is secured on the shaft 30. This agitator 35 consists of a hub portion 36 secured to the shaft 30 and wire loops 37 which are welded or otherwise secured to the hub 36.

It is believed that the nature and advantages of my invention will be apparent from the foregoing description. The novel drive arrangement whereby the drive member 13 is always in engagement with the hay in the passage 10 provides a novel way of proportioning the feed of the powder to the hay. It is now customary to use various powders or granular materials to treat crops such as hay as they are baled, in order to prevent decay or in order to increase the food value thereof. With this device the ratio of powder to hay can be set and will be maintained as the baler is operated. If more hay is fed, more powder will be distributed to it. If no hay is fed and the baler is still operating, no powder will be fed.

The metering mechanism composed of the brush in the chamber 23 and the arrangement of the outlet passages from the hopper 11, insures against loss of powder or skips in application. The powder is actually forced from the hopper in response to the movement of the hay along the hay passage 10.

Having thus described my invention, I claim:

A device for distributing finely divided solid materials comprising a hopper for the finely divided solid materials having an outlet, said hopper having a shallow circular chamber over said outlet, the outlet opening downwardly from the periphery of said chamber, an inlet passage to said chamber from the hopper interior spaced around the chamber from said outlet opening and a brush rotatably mounted in said chamber for sweeping the finely divided solid materials through the chamber from the inlet to the outlet, the chamber having a projection above the outlet operable to give the bristles a flip as they pass over the outlet.

References Cited in the file of this patent

UNITED STATES PATENTS

| Number | Name | Date |
|---|---|---|
| 254,957 | Grow | Mar. 14, 1882 |
| 506,892 | Wiebe | Oct. 17, 1893 |
| 693,724 | Ledbetter | Feb. 18, 1902 |
| 1,013,568 | Sharpe | Jan. 2, 1912 |
| 1,371,343 | Bow | Mar. 15, 1921 |
| 1,454,558 | Paton | May 8, 1923 |
| 1,605,210 | Bohmker | Nov. 2, 1926 |
| 1,679,557 | Bailey | Aug. 7, 1928 |
| 2,504,279 | Sanner | Apr. 18, 1950 |
| 2,565,422 | Edwards | Aug. 21, 1951 |
| 2,567,760 | Boughan | Sept. 11, 1951 |

FOREIGN PATENTS

| Number | Country | Date |
|---|---|---|
| 71,614 | Norway | May 22, 1945 |